Patented Oct. 22, 1929

1,732,221

UNITED STATES PATENT OFFICE

STEPHEN P. BURKE, OF JACKSON HEIGHTS, NEW YORK, ASSIGNOR TO DOHERTY RESEARCH COMPANY, OF NEW YORK, N. Y., A CORPORATION OF DELAWARE

GRAPHITE LUBRICANT

No Drawing.   Application filed February 14, 1925. Serial No. 9,351.

This invention relates to graphite lubricants and more particularly to lubricating oils in which graphite is carried in stable suspension.

Graphite has been extensively used for lubrication either alone or mixed with oil. In that class of graphite lubricants wherein a small percentage of graphite is carried by and suspended in the oil serious difficulties have been encountered in that the graphite will settle out of the oil because the suspensions are not stable. Settled or coagulated graphite in an oil circulating system tends to clog the circulation tubes or passages and therefore suspended graphite lubricants are often considered not to be suitable for such systems. The graphite lubricants which have been developed by E. G. Acheson are suspended graphite lubricating oils which appear to be suitable for circulatory systems, but the amount of graphite used in this oil is extremely small.

The primary object of the present invention is to provide a lubricating oil having a stable or permanent suspension of graphite therein which is suitable for oil circulatory systems.

Another object of the invention is to provide a method of making a lubricating oil having graphite therein by which the graphite may be held in stable and permanent suspension.

Another object of the invention is to provide a method of making lubricating oil having graphite therein by which the proportion of graphite in the oil may be widely varied while maintaining the graphite in stable suspension in the oil.

With these and other objects in view the invention consists in the improved suspended graphite lubricant and method of making the same hereinafter described in the accompanying specification and particularly defined in the following claims.

Graphite has many advantageous lubricating properties, particularly in bearings which are submitted to high weights and pressures. Ordinarily, graphite is much more desirable as a lubricant than mineral oil, but it is often necessary to associate the oil with the graphite in order to properly distribute the graphite in the bearings. The ideal graphite lubricant therefore for many purposes is one in which the graphite in a finely divided state will be maintained in a permanent suspension in the oil so that it may be carried into the bearings along with the oil.

To effect the permanent suspension of graphite in the oil in accordance with the present invention a stabilizing agent, for example, aluminum soap, is employed which tends to hold the finely divided graphite particles in a true permanent suspension in the oil. Aluminum oleate or other aluminum soaps have been found to be very effective stabilizing agents, and $\frac{1}{10}$ of 1% by weight of aluminum oleate has been found to be effective in stabilizing the suspension of 1% by weight of graphite in a mineral lubricating oil. The amount of stabilizing agent which must be used in stabilizing the graphite suspension in the oil depends upon many factors; for example, upon the chemical composition of the oil, i. e., whether it is an oil of asphalt or paraffine base, and also upon the physical properties of the oil, i. e., its boiling point and particularly its viscosity; also the amount of stabilizer required depends upon the physical property of the graphite and particularly upon the amount of impurities and ash in the graphite and the fineness of the graphite particles. Further, the amount of stabilizing agent which must be used in order to make a permanent suspension of graphite in the oil depends upon the percentage of graphite by weight which is to be suspended in the oil.

Accordingly, the amount of stabilizing soap which may be used will vary from $\frac{1}{10}$ of 1% up to 1% by weight of the lubricating compound when suspending graphite in amounts varying from 1/10 of 1% to 5% by weight of the lubricating compound.

Although aluminum soaps and especially aluminum oleate and stearate have been found to be particularly effective as stabilizing agents for stabilizing suspensions of graphite in the oil, it is found that there are many other stabilizing agents which are effective in making stabilized suspension of graphite in the oil. The stabilizing agents which have been found to be most effective are those polyvalent metal soaps or the metal salts of fatty acids which are commonly known as insoluble soaps. For example, iron stearate, iron oleate, and the oleates and stearates of copper, chromium, nickel, cobalt, calcium and magnesium have been found to be effective stabilizing agents. Very commonly the polyvalent metal soaps are composed of a mixture of salts of the fatty acids such as stearic, oleic and palmitic acids, and these soaps have been found to be very effective stabilizing agents for providing permanent suspensions of the graphite in lubricating oils. It has been found in general also that these soaps which are more soluble in or colloidally soluble in and easily wetted by the lubricating oil in which the graphite is to be suspended are more effective in stabilizing the suspensions of graphite in the oil.

The preferred method of making the lubricants having stable suspensions of graphite therein consists in grinding the soap and graphite into a plastic mass. To this plastic mass is then slowly added a lubricating oil preferably heated to a temperature not exceeding the flash point of the oil, usually about 50° to 100° C., and the mixture thoroughly stirred in order to dissolve the soap in the oil. After the soap has been completely dissolved the mass may be diluted with lubricating oil at ordinary temperatures to such an amount that the desired percentage of graphite is placed in suspension in the oil. It is preferred that the mixture of graphite and soap should be heated to about 100° C. while the grinding is carried on, in order to more thoroughly incorporate the graphite in the soap. At the higher temperatures the soaps, particularly iron and aluminum soaps are in a fluid state and the mixing operation can be readily effected.

When the graphite has been properly incorporated in a lubricating oil with the above stabilizing compounds, it has been found that the graphite is in substantially permanent suspension. For example, graphite lubricants liquid at ordinary temperatures made in accordance with the above outlined process have been maintained at a temperature of 150° Fahrenheit for more than three days and no signs of settling have developed. These suspensions have also been allowed to stand at ordinary temperatures, for many months without showing signs of settling.

The term soap has been used in the following claims when defining a stabilizing agent and by this term it is intended to cover a salt of one of the fatty acids such as oleic, palmitic or stearic, or a salt of a mixture of two or more of these acids. The term metal has been used in the following claims when defining a soap and by this term it is intended to include a metal such as aluminum, iron, copper, magnesium, chromium, calcium, nickel or cobalt, or a mixture of two or more of such metals, it being understood that metals of this type usually produce water insoluble soaps.

Having thus described my invention what is claimed as new is:

1. A liquid lubricating compound comprising finely divided graphite held in stable suspension in a mineral oil by less than 1% by weight of a polyvalent metal soap.

2. A liquid lubricating compound comprising finely divided graphite held in stable suspension in a lubricating oil by less than 1% by weight of a polyvalent metal soap.

3. A liquid lubricating compound comprising finely divided graphite held in stable suspension in a lubricating oil by less than 1% by weight of a water insoluble metal soap.

4. A liquid lubricating compound comprising finely divided graphite held in stable suspension in a lubricating oil by less than 1% by weght of aluminum soap.

5. A liquid lubricating compound consisting of finely divided graphite held in stable suspension in a mineral oil by aluminum oleate.

6. A liquid lubricating compound comprising from 0.1 to 5.0% by weight of finely divided graphite held in stable suspension in mineral oil by a polyvalent metal soap.

7. A liquid lubricating compound comprising from 0.1 to 5.0% by weight of finely divided graphite held in stable suspension in a mineral oil by from 0.1 to 1.0% by weight of a water insoluble soap.

8. A method of making a liquid graphite lubricant comprising grinding finely divided graphite with less than 1% by weight of the lubricant of a polyvalent metal soap and then incorporating the mixture in a lubricating oil.

9. A method of making a liquid graphite lubricant comprising grinding finely divided graphite with less than 1% by weight of the lubricant of a polyvalent metal soap, adding a warm lubricating oil to the mixture and stirring to effect a solution of the soap in the oil.

10. A method of making a liquid graphite lubricant comprising grinding finely divided graphite with less than 1% by weight of the lubricant of a polyvalent metal soap to effect a thorough mixing of the graphite with the soap, then dissolving the graphite-soap mixture in a heated lubricating oil to effect the solution of the soap in the oil, and then diluting the oil-soap solution with additional lubricating oil to obtain the desired percentage of graphite in the lubricating oil.

In testimony whereof I affix my signature.
STEPHEN P. BURKE.